US009963531B2

(12) United States Patent
Lu et al.

(10) Patent No.: US 9,963,531 B2
(45) Date of Patent: May 8, 2018

(54) SYNTHESIS OF 2,3,3,3-TETRAFLUOROPROPENE/VINYLIDENE FLUORIDE COPOLYMERS

(71) Applicant: HONEYWELL INTERNATIONAL INC., Morris Plains, NJ (US)

(72) Inventors: Changqing Lu, Snyder, NY (US); Andrew J. Poss, Kenmore, NY (US); Rajiv R. Singh, Getzville, NY (US); David Nalewajek, West Seneca, NY (US); Cheryl Cantlon, Clarence Center, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days. days.

(21) Appl. No.: 15/089,505

(22) Filed: Apr. 2, 2016

(65) Prior Publication Data
US 2016/0215081 A1  Jul. 28, 2016

Related U.S. Application Data

(62) Division of application No. 14/099,602, filed on Dec. 6, 2013, now Pat. No. 9,321,867.

(60) Provisional application No. 61/745,172, filed on Dec. 21, 2012.

(51) Int. Cl.
*C08F 4/30* (2006.01)
*C08F 214/22* (2006.01)
*C08F 214/18* (2006.01)

(52) U.S. Cl.
CPC ......... *C08F 214/22* (2013.01); *C08F 214/18* (2013.01); *C08F 214/182* (2013.01)

(58) Field of Classification Search
USPC ................................................ 526/234, 242
See application file for complete search history.

(56) References Cited

U.S. PATENT DOCUMENTS

| | | | |
|---|---|---|---|
| 2,970,988 A | 2/1961 | Lo | |
| 3,085,996 A | 4/1963 | Lo | |
| 4,086,407 A | 4/1978 | Fozzard | |
| 4,464,519 A * | 8/1984 | Mango | .................... C08F 14/06 526/200 |
| 5,252,666 A * | 10/1993 | Seitz | ..................... C08F 265/04 524/504 |
| 7,642,314 B2 * | 1/2010 | Gharapetian | .......... C09D 15/00 524/543 |
| 7,803,890 B2 * | 9/2010 | Samuels | ................. C08F 14/18 526/252 |
| 8,333,902 B2 | 12/2012 | Mahler et al. | |
| 9,321,867 B2 * | 4/2016 | Lu | ....................... C08F 214/182 |
| 2004/0059079 A1 * | 3/2004 | Vilasagar | .................. C08F 2/38 526/335 |
| 2006/0281859 A1 * | 12/2006 | Suzuki | ..................... C08F 6/02 524/836 |
| 2008/0153977 A1 * | 6/2008 | Samuels | ............... C08F 259/08 525/53 |
| 2008/0153978 A1 | 6/2008 | Samuels et al. | |
| 2008/0171844 A1 * | 7/2008 | Samuels | ............... B60C 1/0008 526/255 |
| 2011/0097529 A1 * | 4/2011 | Durali | ................... C08F 214/22 428/36.9 |
| 2011/0253927 A1 | 10/2011 | Minor et al. | |
| 2011/0269911 A1 | 11/2011 | Morita et al. | |
| 2012/0184697 A1 | 7/2012 | Samuels et al. | |
| 2012/0208007 A1 | 8/2012 | Mukhopadhyay et al. | |

FOREIGN PATENT DOCUMENTS

| | | |
|---|---|---|
| GB | 1 281 976 | 7/1972 |
| JP | 4-164907 A2 | 6/1992 |
| JP | 10-045811 A * | 2/1998 |
| JP | 2012-92285 A2 | 5/2012 |
| WO | WO-2010/005757 A1 * | 1/2010 |
| WO | 2010/042781 A2 | 4/2010 |
| WO | 2010/101304 A1 | 9/2010 |
| WO | 2012/030784 A1 | 3/2012 |
| WO | 2012/112840 A1 | 8/2012 |
| WO | 2012/125786 A2 | 9/2012 |
| WO | 2012/125788 A2 | 9/2012 |

OTHER PUBLICATIONS

P. Bernardo et al., "Membrane Gas Separation: A Review/State of the Art," Industrial & Engineering Chemistry Research, 2009, vol. 48, No. 10, pp. 4683-4663.
PCT Search Report & Opinion for PCT/US2013/074232 dated Mar. 31, 2014.

\* cited by examiner

*Primary Examiner* — Mark Kaucher
*Assistant Examiner* — Henry Hu
(74) *Attorney, Agent, or Firm* — Bruce O. Bradford

(57) ABSTRACT

In accordance with the present invention, aqueous emulsion polymerization processes of synthesizing 2,3,3,3-tetrafluoropropene/vinylidene fluoride copolymers having 2,3,3,3-tetrafluoropropene as the major monomer unit are provided.

18 Claims, No Drawings

SYNTHESIS OF 2,3,3,3-TETRAFLUOROPROPENE/VINYLIDENE FLUORIDE COPOLYMERS

CROSS REFERENCE TO RELATED APPLICATION

The present application is a division of U.S. application Ser. No. 14/099,602, filed Dec. 6, 2013, which application claims the benefit of U.S. Provisional Patent Application No. 61/745,172, filed on Dec. 21, 2012, the disclosure of which is incorporated herein by reference in its entirety.

FIELD OF THE INVENTION

The present invention relates to a process for the improved synthesis of 2,3,3,3-tetrafluoropropene/vinylidene fluoride copolymers having 2,3,3,3-tetrafluoropropene as the major monomer unit.

BACKGROUND OF THE INVENTION 2,3,3,3-Tetrafluoropropene/vinylidene fluoride copolymers (poly-1234yf/VDF) have a variety of potential uses and applications. Depending on the two monomer unit ratios, poly-1234yf/VDF can be used as thermal plastics, coatings, elastomers, and membrane materials.

As membrane materials, one important application of fluoropolymers lies in the area of selective gas separations. The commercial examples in this field include TEFLON AF 2400 and AF 1600, HYFLON AD 80 and AD 60, and CYTOP. See *Ind. Eng. Chem. Res.* 2009, 48, 4638-4663. Recently, poly-1234yf/VDF has demonstrated superior separation properties for several gas pairs. International Publication No. WO 2012/112840 demonstrates good selectivities for $O_2/N_2$ and $CO_2/N_2$ separations using polymeric membranes made of 2,3,3,3-tetrafluoropropene/vinylidene fluoride copolymers having VDF as the major monomer unit. The high molecular weight 2,3,3,3-tetrafluoropropene/vinylidene fluoride copolymers with 2,3,3,3-tetrafluoropropene as the major monomer unit (about 90/10 mol %) exhibit excellent selectivities in $CO_2/CH_4$ and $H_2/CH_4$ separations, as disclosed in U.S. application Ser. No. 13/679,251.

As described in International Publication No. WO 2010/101304, 2,3,3,3-tetrafluoropropene/vinylidene fluoride copolymers can be synthesized by solution polymerization methods, i.e., at low temperatures (e.g., 25° C.) with a wide range of monomer unit ratios. However, the obtained copolymers with 2,3,3,3-tetrafluoropropene as the major monomer unit have relatively low molecular weight and low glass transition temperature.

2,3,3,3-Tetrafluoropropene/vinylidene fluoride copolymers can also be synthesized by an aqueous emulsion polymerization method. U.S. Patent Application Publication No. 2011/0097529 discloses the synthesis of 2,3,3,3-tetrafluoropropene/vinylidene fluoride copolymers by emulsion polymerization process at 83° C. or 110° C. International Publication Nos. WO 2012/125786 and WO 2012/125788 disclose the synthesis of 2,3,3,3-tetrafluoropropene/vinylidene fluoride copolymers using non-fluorinated surfactants in an aqueous emulsion process at 83° C. However, these patent publications primarily concern the synthesis of 2,3,3,3-tetrafluoropropene/vinylidene fluoride copolymers having VDF as the major monomer unit at relatively high temperatures.

In order to obtain high molecular weight polymers, polymerization is usually carried out at relatively low temperatures using redox pair initiators. However, at relatively low temperatures, for example 35 to 45° C., the initiation and propagation process of the aqueous emulsion copolymerization of 2,3,3,3-tetrafluoropropene/vinylidene fluoride with 2,3,3,3-tetrafluoropropene as the major monomer unit are very difficult, due to the relatively low polymerization reactivity of 2,3,3,3-tetrafluoropropene and the much lower boiling point of VDF which tends to be present in the vapor phase. Under these conditions, the copolymerization of 2,3,3,3-tetrafluoropropene/vinylidene fluoride with 2,3,3,3-tetrafluoropropene as the major monomer unit becomes sluggish with the initiation and propagation process depending on the reactor configuration and the stir rate. In addition, at low temperatures, the yields of the copolymerization are relatively low, though the relatively high amounts of redox pair initiators are used, which could result in, to some extent, the homopolymerization of 2,3,3,3-tetrafluoropropene.

There remains a need for improved synthesis of 2,3,3,3-tetrafluoropropene/vinylidene fluoride copolymers having 2,3,3,3-tetrafluoropropene as the major monomer unit.

SUMMARY OF THE INVENTION

In accordance with one aspect of the present invention, this need is addressed by conducting copolymerization of 2,3,3,3-tetrafluoropropene/vinylidene fluoride in an aqueous emulsion polymerization process at temperatures from about 55° C. to about 70° C. with a radical initiator.

In accordance with another aspect of the present invention, copolymerization of 2,3,3,3-tetrafluoropropene/vinylidene fluoride is conducted via an aqueous emulsion polymerization process with a radical initiator which could be added into the copolymerization at multiple times.

DETAILED DESCRIPTION OF THE INVENTION

The present invention provides an improved process to synthesize 2,3,3,3-tetrafluoropropene/vinylidene fluoride copolymers with 2,3,3,3-tetrafluoropropene as the major monomer unit by aqueous emulsion polymerization, using at least one water soluble radical initiator.

The water soluble radical initiators may include any compounds that initiate the copolymerization of 2,3,3,3-tetrafluoropropene and vinylidene fluoride monomers. Non-limiting examples of such initiators include $Na_2S_2O_8$, $K_2S_2O_8$, $(NH_4)_2S_2O_8$, $Fe_2(S_2O_8)_3$, $K_2S_2O_8/FeSO_4$, $(NH_2)_2S_2O_8/FeSO_4$, and the like, as well as combinations thereof.

The copolymerization of 2,3,3,3-tetrafluoropropene and vinylidene fluoride monomers may be conducted in any aqueous emulsion systems, particularly aqueous emulsion systems that can be used in conjunction with a free radical polymerization. Such aqueous emulsion systems may include, but are not limited to, degassed deionized water, buffer compounds (such as, but not limited to, $Na_2HPO_4/NaH_2PO_4$), and an emulsifier (such as, but not limited to, $C_7F_{15}CO_2NH_4$, $C_4F_9SO_3K$, $CH_3(CH_2)_{11}OSO_3Na$, $C_{12}H_{25}C_6H_4SO_3Na$, $C_9H_{19}C_6H_4O(C_2H_4O)_{10}H$, or the like).

The copolymerization is typically carried out at a temperature, pressure and length of time sufficient to produce the desired 2,3,3,3-tetrafluoropropene/vinylidene fluoride copolymers and may be performed in any reactor known for such purposes, such as, but not limited to, an autoclave reactor.

In certain embodiments of the present invention, the copolymerization is carried out at a temperature from about 55° C. to about 70° C. and at a pressure from about 50 psi to about 1,000 psi. The copolymerization may be conducted for any length of time that achieves the desired level of copolymerization. In certain embodiments of the present invention, the copolymerization may be conducted for a time that is from about 12 hours to about 100 hours. One of skill in the art will appreciate that such conditions may be modified or varied based upon the desired conversion rate and the desired molecular weight of the resulting 2,3,3,3-tetrafluoropropene/vinylidene fluoride copolymers.

The relative monomer unit ratios of 2,3,3,3-tetrafluoropropene/vinylidene fluoride copolymers may be provided to control the glass transition temperature, the mechanical strength, and the gas separation selectivity of the polymeric membranes made of the said copolymers. Generally, though not exclusively, the monomer unit ratios of 2,3,3,3-tetrafluoropropene/vinylidene fluoride copolymers in the present invention are controlled from about 80/20 mol % to about 99/1 mol %.

The relative amount of initiator may be provided to control the conversion percentage of the copolymer produced and/or the molecular weight range of the copolymer produced. Generally, though not exclusively, the radical initiator is provided at a concentration of less than 1 weight percent based on the weight of all the monomers in the copolymerization reaction.

The initiator may be added into the copolymerization system multiple times to obtain the desired copolymerization yield and the molecular weight range of the copolymer produced. Generally, though not exclusively, the initiator is added 1 to 3 times into the copolymerization system.

The following U.S. patents and patent publications further describe the copolymerization of 2,3,3,3-tetrafluoropropene/vinylidene fluoride and are incorporated herein by reference in their entirety: U.S. Pat. Nos. 2,970,988 and 3,085,996 and U.S. Patent Publication Nos. 2008/0153977, 2008/0153978, and 2008/0171844.

The following examples further illustrate the present invention, but should not be construed to limit the scope of the invention in any way.

EXAMPLES

Comparative Example 1

Into 100 mL of degassed deionized water with stirring, 2.195 g of $Na_2HPO_4.7H_2O$, 0.579 g of $NaH_2PO_4$, and 2.168 g of $C_7F_{15}CO_2NH_4$ were added. 0.304 g of $(NH_4)_2S_2O_8$ was added into the above aqueous solution with stirring and nitrogen bubbling. The obtained aqueous solution was immediately transferred into an evacuated 300 mL autoclave reactor through a syringe. The reactor was cooled with dry ice while the aqueous solution inside was slowly stirred. When the internal temperature decreased to about −4° C., the transfer of a mixture of 2,3,3,3-tetrafluoropropene (114.1 g) and vinylidene fluoride (17.7 g) was started. At the end of the transfer, a total of 130.8 g of the mixture was transferred into the autoclave reactor. The dry ice cooling was removed. The autoclave reactor was slowly warmed up by air. The aqueous solution inside was stirred at 300 rpm.

When the internal temperature increased to about 10° C., 0.303 g of $Na_2S_2O_5$ dissolved in 5 mL degassed deionized water was pumped into the autoclave reactor. The autoclave reactor was slowly heated up to 45° C. The stir rate was increased to 650 rpm. The initial internal pressure was 282 psi.

Over 60 hours of polymerization, the internal pressure decreased to 125 psi. The heating was stopped due to the stir difficulty. At room temperature, the residual pressure was slowly released. The solid copolymer precipitate surrounding the stirrer was taken out and thoroughly washed with deionized water. The copolymer was then dried under vacuum (29 in. Hg) at 35° C. to dryness. The dry copolymer weighed 33.9 g to give a yield of 25.9%.

The actual monomer unit ratio in the copolymer determined by $^{19}F$ NMR was 91.1 mol% of 2,3,3,3-tetrafluoropropene and 8.9 mol % of vinylidene fluoride. The weight average molecular weight of the copolymer measured by GPC included 900,060 (major) and 19,284 (minor).

Example 1

Into 100 mL of degassed deionized water with stirring, 2.136 g of $Na_2HPO_4.7H_2O$, 0.588 g of $NaH_2PO_4$, and 2.157 g of $C_7F_{15}CO_2NH_4$ were added. 0.109 g of $(NH_4)_2S_2O_8$ was added into the above aqueous solution with stirring and nitrogen bubbling. The obtained aqueous solution was immediately transferred into an evacuated 300 mL autoclave reactor through a syringe. The autoclave reactor was cooled with dry ice and the aqueous solution inside was slowly stirred. When the internal temperature decreased to about −4° C., the transfer of a mixture containing 110.5 g of 2,3,3,3-tetrafluoropropene and 11.9 g of vinylidene fluoride into the autoclave reactor was started. At the end of the transfer, a total of 121.8 g of the mixture was transferred into the autoclave reactor. The dry ice cooling was removed. The autoclave reactor was slowly warmed up by air. The aqueous solution inside was stirred at 300 rpm.

When the internal temperature increased to about 10° C., 0.296 g of $FeSO_4.7H_2O$ dissolved in 7 mL degassed deionized water was pumped into the autoclave reactor. The autoclave reactor was slowly heated up to 55° C. The stir rate was increased to 500 rpm. The initial internal pressure was 293 psi.

After 63 hours at 55° C., the internal pressure was 297 psi. The heating was then stopped. At room temperature, 0.110 g of $(NH_4)_2S_2O_8$ dissolved in 5 mL degassed deionized water was pumped into the autoclave reactor. The autoclave reactor was slowly heated up to 60° C., the initial internal pressure was 348 psi.

After 42 hours of polymerization at 60° C., the internal pressure decreased to 134 psi. The heating was then stopped due to the stir difficulty. At room temperature, the residual pressure was slowly released. The solid copolymer precipitate surrounding the stirrer was taken out and thoroughly washed with deionized water. The copolymer was then dried under vacuum (29 in. Hg) at 40° C. to dryness. The dry copolymer weighed 73.9 g to give a yield of 60.7%.

The actual monomer unit ratio in the copolymer determined by $^{19}F$ NMR was 89.9 mol% of 2,3,3,3-tetrafluoropropene and 10.1 mol % of vinylidene fluoride. The weight average molecular weight of the copolymer measured by GPC was 120,540.

Example 2

Into 100 mL of degassed deionized water with stirring, 2.187 g of $Na_2HPO_4.7H_2O$, 0.583 g of $NaH_2PO_4$, and 2.120 g of $C_7F_{15}CO_2NH_4$ were added. 0.106 g of $(NH_4)_2S_2O_8$ was added into the above aqueous solution with stirring and nitrogen bubbling. The obtained aqueous solution was immediately transferred into an evacuated 300 mL autoclave reactor through a syringe. The autoclave reactor was cooled with dry ice and the aqueous solution inside was slowly stirred. When the internal temperature decreased to about −4° C., the transfer of a mixture containing 100.7 g of 2,3,3,3-tetrafluoropropene and 11.7 g of vinylidene fluoride into the autoclave reactor was started. At the end of the transfer, a total of 111.7 g of the mixture was transferred into the autoclave reactor. The dry ice cooling was removed. The autoclave reactor was slowly warmed up by air. The aqueous solution inside was stirred at 300 rpm.

The autoclave reactor was slowly heated up to 60° C. Meanwhile, the stir rate was increased to 500 rpm. The initial internal pressure was 327 psi.

Over 63 hours of polymerization, the internal pressure decreased to 29 psi. The heating was stopped. The autoclave reactor was cooled down by air. At room temperature, the residual pressure was slowly released. The copolymerization mixture became a white paste and a solid chunk surrounding the stirrer. The white paste and solid chunk were taken out and thoroughly washed with deionized water. After filtration, the combined copolymers were dried under vacuum (29 in. Hg) at 35° C. to dryness. The dry copolymers totally weighed 98.7 g to give a yield of 88.4%.

The actual monomer unit ratio in the copolymer determined by $^{19}$F NMR was 84.7 mol% of 2,3,3,3-tetrafluoropropene and 15.3 mol% of vinylidene fluoride. The weight average molecular weight of the copolymer measured by GPC was 90,559.

What is claimed is:

1. A process of synthesizing a copolymer consisting essentially of units derived from 2,3,3,3-tetrafluoropropene and vinylidene fluoride monomers, the process comprising the step of conducting an aqueous emulsion copolymerization of said monomers in the presence of a water soluble radical initiator to form the 2,3,3,3-tetrafluoropropene/vinylidene fluoride copolymer wherein the 2,3,3,3-tetrafluoropropene/vinylidene fluoride copolymer has a monomer molar unit ratio of 2,3,3,3-tetrafluoropropene/vinylidene fluoride between about 80/20 and about 99/1, wherein the copolymerization is carried out at a temperature from about 55° C. to about 70° C. and wherein the amount of said water soluble radical initiator is less than 1 wt % based on the weight of all the monomers in the copolymerization and is sufficiently low to produce a yield of copolymer of at least about 60%.

2. The process of claim 1, wherein the monomers consist of 2,3,3,3-tetrafluoropropene and vinylidene fluoride.

3. The process of claim 1, wherein the water soluble radical initiator is selected from the group consisting of $Na_2S_2O_8$, $K_2S_2O_8$, $(NH_4)_2S_2O_8$, $Fe_2(S_2O_8)_3$, $K_2S_2O_8$/$FeSO_4$, $(NH_4)_2S_2O_8$/$FeSO_4$, and combinations of two or more of these.

4. The process of claim 1, wherein the involved water soluble radical initiator is added into the copolymerization in multiple portions and at spaced apart times during the reaction.

5. The process of claim 4, wherein the involved water soluble radical initiator is added into the copolymerization in two or three portions and at two or three different times during the reaction.

6. The process of claim 5, wherein the involved water soluble radical initiator is added into the copolymerization at a first time when the reaction is at a first reaction temperature and again at a second, later time when the reaction is at a second reaction temperature different than said first reaction temperature.

7. A process of synthesizing a copolymer consisting essentially of units derived from 2,3,3,3-tetrafluoropropene and vinylidene fluoride monomers, the process comprising the step of conducting an aqueous emulsion copolymerization of said monomers in the presence of a water soluble radical initiator to form the 2,3,3,3-tetrafluoropropene/vinylidene fluoride copolymer, wherein the 2,3,3,3-tetrafluoropropene/vinylidene fluoride copolymer has a monomer molar unit ratio of 2,3,3,3-tetrafluoropropene/vinylidene fluoride between about 80/20 and about 99/1 and wherein the water soluble radical initiator is added into the copolymerization at multiple times and the total amount is less than 1 wt % based on the weight of all the monomers in the copolymerization.

8. The process according to claim 7, wherein the monomers consist of 2,3,3,3-tetrafluoropropene and vinylidene fluoride.

9. The process of claim 7, wherein the water soluble radical initiator is selected from the group consisting of $Na_2S_2O_8$, $K_2S_2O_8$, $(NH_4)_2S_2O_8$, $Fe_2(S_2O_8)_3$, $K_2S_2O_8$/$FeSO_4$, $(NH_4)_2S_2O_8$/$FeSO_4$ and combinations of two or more of these.

10. The process of claim 7, wherein the involved water soluble radical initiator is added into the copolymerization in multiple portions and at spaced apart times during the reaction.

11. The process of claim 10, wherein the water soluble radical initiator is added into the copolymerization at a first time when the reaction is at a first reaction temperature and again at a second, later time when the reaction is at a second reaction temperature different than said first reaction temperature.

12. The process of claim 10,
wherein a first water soluble radical initiator is added into the copolymerization at a first time,
wherein a second water soluble radical initiator is added into the copolymerization at a second time which is different from said first time, and
wherein said first water soluble radical initiator is different from said second water soluble radical initiator.

13. The process of claim 7, wherein the amount of said water soluble radical initiator is sufficiently low to produce a yield of copolymer of at least about 60%.

14. The process of claim 7, wherein the amount of said water soluble radical initiator is sufficiently low to produce a yield of copolymer of at least about 60%.

15. The process of claim 9, wherein the amount of said water soluble radical initiator is sufficiently low to produce a yield of copolymer of at least about 60%.

16. The process of claim 10, wherein the amount of said water soluble radical initiator is sufficiently low to produce a yield of copolymer of at least about 60%.

17. The process of claim 11, wherein the amount of said water soluble radical initiator is sufficiently low to produce a yield of copolymer of at least about 60%.

18. The process of claim 12, wherein the amount of said water soluble radical initiator is sufficiently low to produce a yield of copolymer of at least about 60%.

* * * * *